(12) United States Patent
Tsuneyoshi et al.

(10) Patent No.: US 10,942,074 B2
(45) Date of Patent: Mar. 9, 2021

(54) METHOD FOR MONITORING SPINDLE PRELOAD AMOUNT

(71) Applicant: Precision Machinery Research & Development Center, Taichung (TW)

(72) Inventors: Tadao Tsuneyoshi, Gresham, OR (US); Peng-Jui Chen, Taichung (TW); Chi-Cheng Kuo, Taichung (TW); Tung-Yi Lu, Taichung (TW); Hsing-Chieh Huang, Taichung (TW)

(73) Assignee: Precision Machinery Research & Development Center, Taichung (TW)

( * ) Notice: Subject to any disclaimer, the term of this patent is extended or adjusted under 35 U.S.C. 154(b) by 0 days.

(21) Appl. No.: 16/155,336

(22) Filed: Oct. 9, 2018

(65) Prior Publication Data
US 2020/0033210 A1    Jan. 30, 2020

(30) Foreign Application Priority Data
Jul. 26, 2018   (TW) .................................. 107125894

(51) Int. Cl.
*G01L 5/00*    (2006.01)
*G01L 5/12*    (2006.01)

(52) U.S. Cl.
CPC .............. *G01L 5/12* (2013.01); *G01L 5/0009* (2013.01)

(58) Field of Classification Search
CPC ................................. G01L 5/12; G01L 5/0009
USPC ....................................................... 73/862.49
See application file for complete search history.

(56) References Cited

U.S. PATENT DOCUMENTS

| | | | |
|---|---|---|---|
| 6,546,781 B1* | 4/2003 | Deegan ................ | G01N 29/045 73/1.82 |
| 2007/0220964 A1* | 9/2007 | Shinomoto ........... | G01M 1/045 73/146 |
| 2011/0081216 A1* | 4/2011 | Ogura ................... | B23Q 1/265 409/141 |

* cited by examiner

*Primary Examiner* — Max H Noori
*Assistant Examiner* — Masoud H Noori
(74) *Attorney, Agent, or Firm* — Muncy, Geissler, Olds & Lowe, P.C.

(57) ABSTRACT

A method for monitoring the spindle preload amount of a spindle by: S1 obtaining a spindle preload amount through a PPC Preload Analyzer; and S2 obtaining an axial force sensor output of the spindle through an axial force sensor, wherein the axial force sensor output is calibrated using the spindle preload amount that is obtained through the PPC Preload Analyzer; establishing a relationship between the spindle preload amount and the axial force sensor output, then regarding the axial force sensor output as the spindle preload amount, and then monitoring the spindle preload amount by monitoring the axial force sensor output.

4 Claims, 3 Drawing Sheets

METHOD FOR MONITORING SPINDLE PRELOAD AMOUNT

BACKGROUND OF THE INVENTION

1. Field of the Invention

The present invention relates to spindle preload amount monitoring technology and more particularly, to a method for instantaneously monitoring spindle preload amount using an axial force sensor.

2. Description of the Related Art

Whether it is daily necessities in life or mechanical equipment in the industry, it is often necessary to use a machine tool for processing during the manufacturing process. The spindle preload amount plays an extremely important role in improving the machining accuracy and cutting performance of the spindle of the machine tool. Because the size of the spindle preload amount directly affects the dynamic performance of the spindle, such as: spindle rigidity, rotation accuracy, spindle temperature rise, cutting efficiency and life, etc., how to properly adjust the spindle preload amount becomes a crucial factor in optimizing the performance of the machine tool.

However, the current measures used in the industry for measuring the spindle preload amount are implemented through the natural frequency method or the torque method. However, the aforementioned measurement methods indirectly infer the size of the spindle preload amount, and therefore there is a great gap between the inferred preload amount and the actual preload amount. Furthermore, the aforementioned measurement methods are also susceptible to the influence of the machine structure or the test environment, resulting in an increased possibility of error.

In addition, since the spindle preload amount varies with operating conditions (such as spindle speed, spindle temperature, etc.), the aforementioned measurement methods cannot effectively and instantly monitor the current preload amount of the spindle during operation. There is still room for improvement.

SUMMARY OF THE INVENTION

The present invention has been accomplished under the circumstances in view. It is the main object of the present invention to provide a method for monitoring spindle preload amount that can effectively and instantly monitor the preload amount of the spindle.

To achieve this and other objects of the present invention, a method for monitoring spindle preload amount comprises the steps of: S1 obtaining a spindle preload amount through a PPC Preload Analyzer; and S2 obtaining an axial force sensor output of the spindle through an axial force sensor, wherein said axial force sensor output is calibrated using said spindle preload amount that is obtained through said PPC Preload Analyzer; establishing a relationship between the spindle preload amount and the axial force sensor output, then regarding the axial force sensor output as the spindle preload amount, and then monitoring the spindle preload amount by monitoring the axial force sensor output.

Thus, through the foregoing characteristics of the present invention, when the spindle is in actual application, the user can immediately know the current spindle preload amount through the axial force sensor output monitored by the axial force sensor and the relationship between the spindle preload amount and the axial force sensor output, achieving the effect of monitoring the preload amount.

Preferably, the axial force sensor is installed on the spindle.

Preferably, the spindle comprises a bearing spacer, and the axial force sensor is installed on the bearing spacer.

Preferably, in step S2, when the spindle is in an operating condition, the spindle preload amount is obtained through the axial force sensor output that is measured by the axial force sensor.

Other advantages and features of the present invention will be fully understood by reference to the following specification in conjunction with the accompanying drawings, in which like reference signs denote like components of structure.

DETAILED DESCRIPTION OF THE INVENTION

Figure 1:
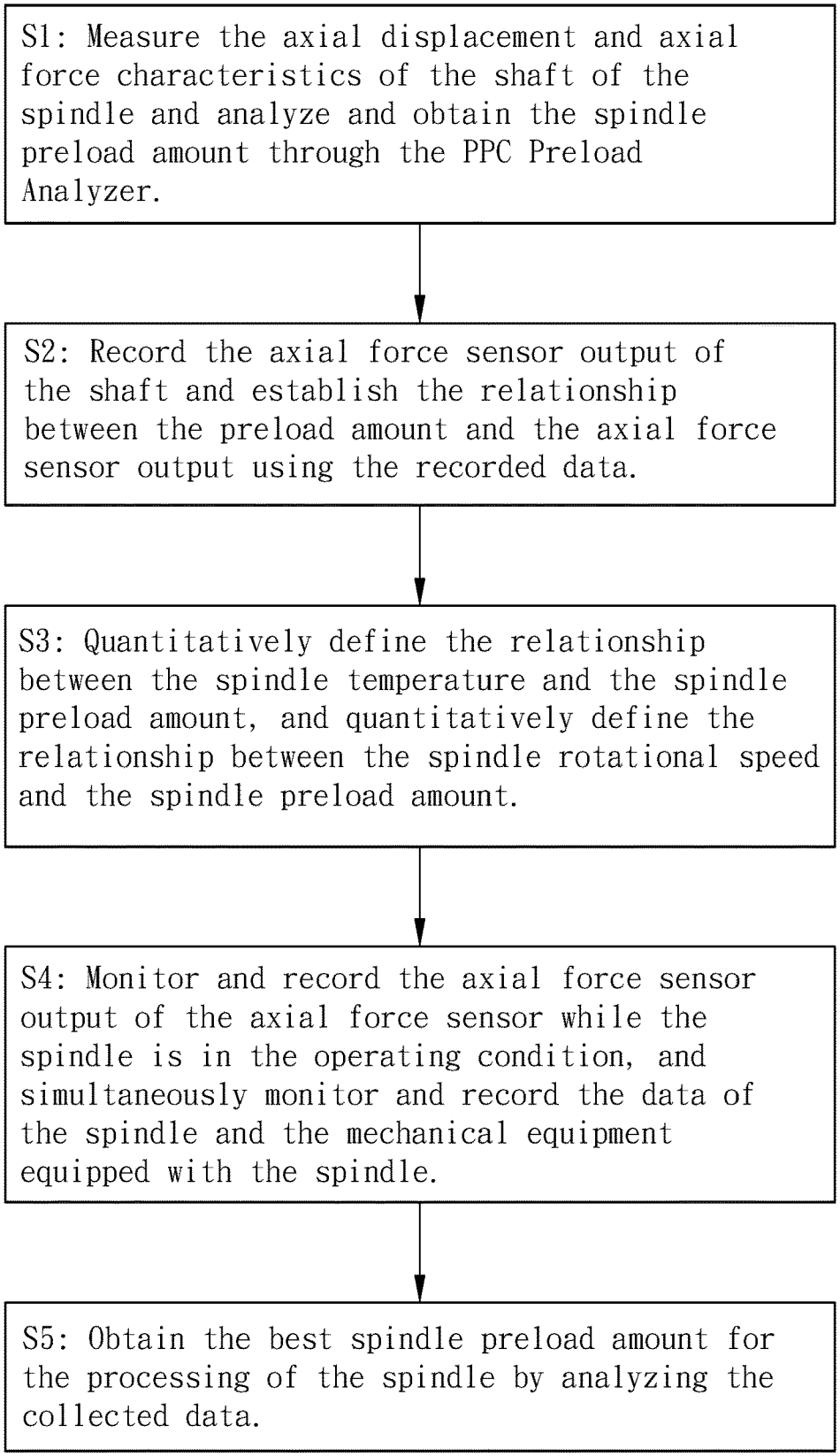
FIG. 1 is a flow chart of a method for monitoring spindle preload amount in accordance with the present invention.
Figure 2:
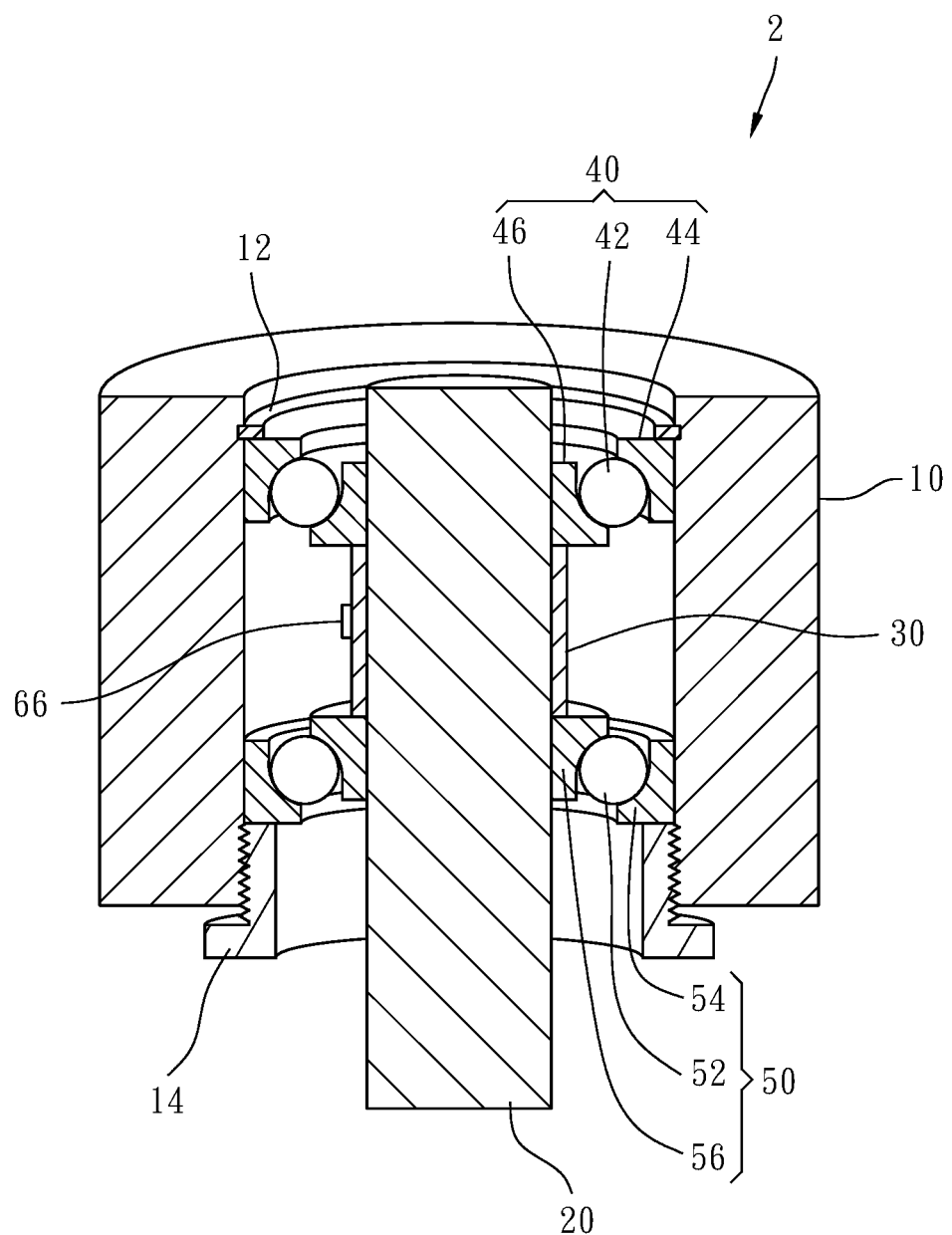
FIG. 2 is a sectional view of the spindle.

FIG. 1 is a flow chart of the present invention. FIG. 2 is a sectional view of a spindle 2 or rotating assembly. The spindle 2 comprises a housing 10, a shaft 20, a bearing spacer 30, a first bearing 40 and a second bearing 50. The first bearing 40 comprises a plurality of first rolling members 42, a first outer race 44 and a first inner race 46. The second bearing 50 comprises a plurality of second rolling members 52, a second outer race 54 and a second inner race 56. The first outer race 44 is secured to the inside of the housing 10 by a retainer ring 12. The second outer race 54 is secured to the inside of the housing 10 by a threaded ring 14 that is threaded into the housing 10. The bearing spacer 30 has two opposite ends thereof respectively stopped against the first inner race 46 and the second inner race 56. The first inner race 46, the second inner race 56 and the bearing spacer 30 are mounted on the shaft 20 for synchronous rotation. The spindle 2 is configured for allowing rotation of the shaft 20 relative to the housing 10. In some embodiments, a machine tool (not shown) includes the spindle 2, a column, a cross beam, a ram, a head stock, a table, a base and an oil tank (not shown). The oil tank is filled with oil for lubricating and cooling the spindle 2.

It should be emphasized that although ball bearings are used as an illustration in the present preferred embodiment and the annexed drawings, the method of the present invention is applicable but not limited to structures such as roller bearings and similar bearings. Ball bearing is only an example and should not be considered as a limitation. Referring also to FIG. 2, in the present preferred embodiment, the user can change the preload amount of the first bearing 40 and the second bearing 50 by adjusting the position of the threaded ring 14. When the threaded ring 14 is screwed into the housing 10 and is not in contact with the second outer race 54, the first rolling member 42 and the second rolling member 52 have not yet reached a tight fit with the first outer race 44 and the first inner race 46 of the first bearing 40 and the second outer race 54 and the second inner race 56 of the second bearing 50, therefore, the shaft 20 can still freely move laterally or axially by a certain distance, which is a case where the preload amount is zero.

When the threaded ring 14 is further screwed into the housing 10, the second bearing 50, the bearing spacer 30 and the first bearing 40 will move toward the retainer ring 12 until they abut on one another. If the threaded ring 14 is further screwed in, the first and second bearings 40, 50 of the spindle 2 will generate a preload amount. As the threaded ring 14 is screwed in, the preload amount will be larger. In this embodiment, the preload amount is expressed as force, and the unit is expressed in Newton, but may be, but not limited to, expressed as Size, the unit is expressed in μm.

Figure 3:
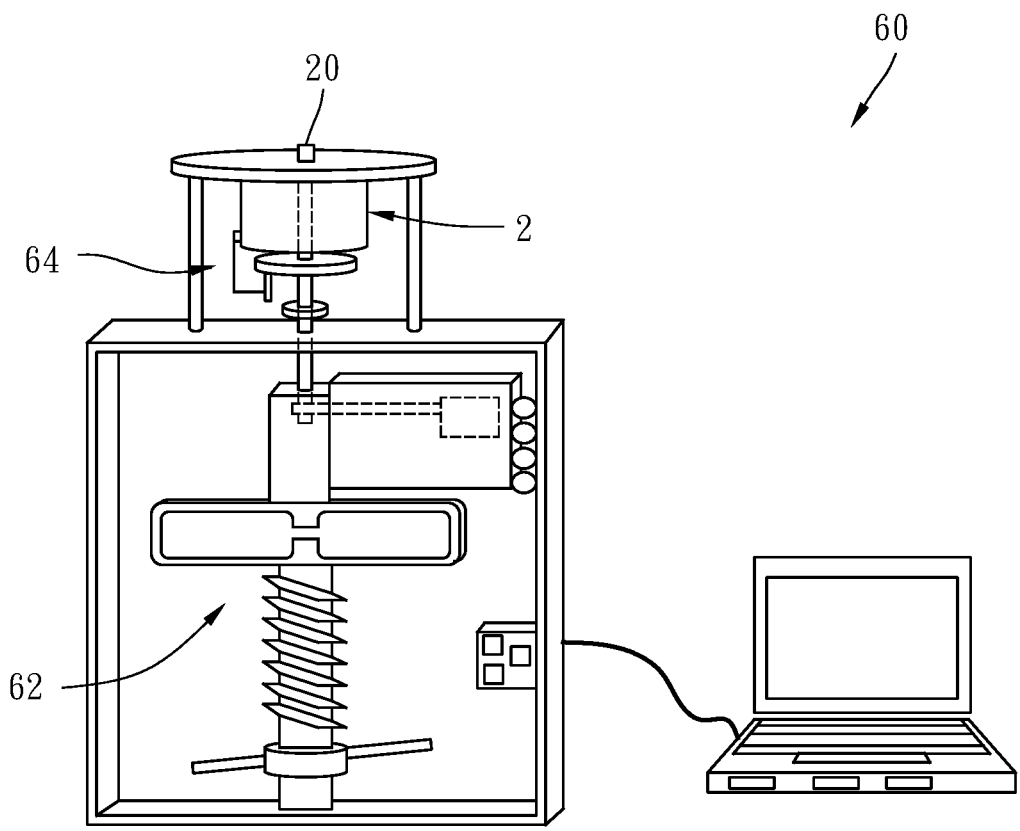
FIG. 3 is a system diagram of a PPC Preload Analyzer consisting of a force load module and a displacement sensor module.

FIG. 3 is a system diagram of a PPC Preload Analyzer (Push-Pull-Curve Preload Analyzer) 60 for measuring the preload amount of the bearings 40, 50 of the spindle 2. The PPC Preload Analyzer 60 comprises a force load module 62 and a displacement sensor module 64. A force-displacement curve for the spindle 2 can be derived through the PPC Preload Analyzer 60 and combined with the preload amount analysis method of the PPC Preload Analyzer 60, to obtain the preload amount of the bearings 40, 50 of the spindle 2. It should be specially noted that the detailed structure of the PPC Preload Analyzer 60 and the application of the preload amount analysis method have been fully and in detail disclosed in PCT International Publication No. WO 2010/010451, in order to save space, the applicant will not repeat them.

Referring to FIGS. 1-3 again, the method for monitoring spindle preload amount comprises Steps S1~S5.

In Step S1, measure the axial displacement and axial force characteristics of the shaft 20 of the spindle 2, and analyze and obtain the spindle preload amount through the PPC Preload Analyzer 60. In the present preferred embodiment, measure the axial displacement and the axial force of the shaft 20 of the spindle 2 in a cold condition, and analyze the spindle preload amount through the PPC Preload Analyzer 60 wherein, the cold condition refers to a state in which the temperature of the spindle 2 is the same as the room temperature, and the rotation speed of the spindle 2 is zero or extremely low.

In Step S2, synchronously acquire an axial force sensor output of the spindle 2 through an axial force sensor 66, wherein the axial force sensor output corresponds to the spindle preload amount. Then, establish the relationship between the spindle preload amount and the axial force sensor output, thus the axial force sensor output can be regarded as the spindle preload amount, and the spindle preload amount is monitored by monitoring the axial force sensor output.

In the present preferred embodiment, the axial force output value of the shaft 20 is recorded while measuring the axial displacement and axial force of the shaft 20 of the spindle 2. At this time, the spindle 2 is also in a cold condition, and the axial force sensor output is calibrated through the spindle preload amount that is obtained by the PPC Preload Analyzer 60. In step S2, the axial force sensor 66 is installed on the bearing spacer 30, however, in actual application, this mounting arrangement is not a limitation, for example, the axial force sensor 66 can be installed on, but not limited to, the housing 10, the threaded ring 14, the shaft 20, the first bearing 40 or the second bearing 50 (not shown). In addition, the axial force sensor 66 may be a strain gauge or a piezoelectric element. In this embodiment, a strain gauge is selected, and the axial force sensor output obtained by the axial force sensor 66 is a voltage value.

Since the relationship between the spindle preload amount and the axial force sensor output has been established in Step S2, the user can obtain the spindle preload amount by measuring the axial force sensor output that is measured by the axial force sensor 66 when the spindle 2 is in an operating condition, wherein, the operating condition refers to the state of the spindle 2 during actual processing, and the spindle 2 is in the working temperature and the rotating state.

In Step S3, the present invention further discloses a method for quantitatively defining the relationship between the temperature of the spindle 2 and the spindle preload amount, and a method for quantitatively defining the relationship between the rotational speed of the spindle 2 and the spindle preload amount.

The method for quantitatively defining the relationship between the temperature of the spindle 2 and the spindle preload amount comprises the steps of: regarding the axial force sensor output as the spindle preload amount subject to the relationship established between the spindle preload amount and the axial force sensor output in the aforesaid Steps S1 and Step S2, then obtaining the temperature of the spindle 2 through a temperature sensor (not shown) and the corresponding axial force sensor output through the axial force sensor 66 and then establishing the relationship between the obtained temperature and the obtained axial force sensor output for quantitatively defining the relationship between the temperature of the spindle 2 and the spindle preload amount. In the present preferred embodiment, the temperature sensor is installed on the spindle 2, that is, the temperature sensor can be disposed on, but not limited to, the bearing spacer 30, the housing 10, the threaded ring 14, the shaft 20, the first bearing 40 or the second bearing 50 (not shown). In some embodiments, the temperature sensor can be disposed on, but not limited to, the elements of the machine tool, such as the column, the cross beam, the ram, the head stock, the table, the base or the oil tank etc.

It should be added that since the temperature and speed of the spindle 2 affect the spindle preload amount, in order to quantitatively define the relationship between the temperature of the spindle 2 and the spindle preload amount in the present preferred embodiment, when measuring the temperature of the spindle 2 and the corresponding axial force sensor output, the first is to let the spindle 2 be in the operating condition. At this time, the rotation speed and temperature of the spindle 2 will be higher than the rotation speed and temperature in the cold condition. Then, the spindle 2 is stopped. At the moment when the spindle 2 stops running, measure the current axial force sensor output through the axial force sensor 66 and the current temperature of the spindle 2 through the temperature sensor. Since the temperature of the spindle 2 is still at the operating condition temperature and the speed of the spindle 2 is zero, the influence of the speed of the spindle 2 on the spindle preload amount can be avoided. At this point, a set of corresponding spindle 2 temperature and axial force sensor output can be obtained. Then, repeat the foregoing process several times to obtain multiple sets of corresponding spindle 2 temperatures and axial force sensor outputs, and then analyze these multiple sets of corresponding spindle 2 temperatures and axial force sensor outputs to establish the relationship between temperature and axial force sensor output, and to quantitatively define the relationship between the temperature of the spindle 2 and the spindle preload amount. Then, based on the foregoing relationship, establish the relationship between the temperature of the spindle 2 and the spindle preload amount when the spindle 2 is in the room temperature of the cold condition and the relationship between the temperature of the spindle 2 and the spindle preload amount when the spindle 2 is in the operating temperature.

In Step S3, the method for quantitatively defining the relationship between the rotational speed of the spindle 2 and the spindle preload amount comprises the steps of: regarding the axial force sensor output as the spindle preload amount subject to the relationship between the spindle preload amount and the axial force sensor output established in Step S1 and Step S2, then obtaining the rotational speed of the spindle 2 through a rotational speed sensor (not shown) and the corresponding axial force sensor output through the axial force sensor 66, and then establishing the relationship between the rotational speed and the axial force sensor output for defining the relationship between the rotational speed of the spindle 2 and the spindle preload amount.

It is to be added that since the temperature and rotational speed of the spindle 2 can affect the spindle preload amount, for quantitatively defining the relationship between the rotational speed of the spindle 2 and the spindle preload amount in the present preferred embodiment, let the spindle 2 be in the cold condition when measuring the rotational speed of the spindle 2 and the corresponding axial force sensor output. At this point, the rotational speed of the spindle 2 is zero, and the temperature of the spindle 2 is at the room temperature. Then, let the spindle 2 start operating under the operating condition. At the moment of starting the operation, measure the current axial force sensor output through the axial force sensor 66 and the current rotational speed of the spindle 2 through the rotational speed sensor. Since the rotational speed of the spindle 2 is at a high speed of the operating condition but the temperature of the spindle 2 is still at the room temperature of the cold condition at this moment, the influence of the temperature of the spindle 2 on the spindle preload amount can be avoided. At this point, a set of corresponding spindle 2 rotational speed and axial force sensor output can be obtained. Then, repeat the foregoing process several times to obtain multiple sets of corresponding spindle 2 rotational speeds and axial force sensor outputs, and then analyze these multiple sets of corresponding spindle 2 rotational speeds and axial force sensor outputs to establish the relationship between rotational speed and axial force sensor output, and to quantitatively define the relationship between the rotational speed of the spindle 2 and the spindle preload amount. Then, based on the foregoing relationship, establish the relationship between the rotational speed of the spindle 2 and the spindle preload amount when the spindle 2 is in the low speed condition of the cold condition and the relationship between the rotational speed of the spindle 2 and the spindle preload amount when the spindle 2 is in the operating speed of the operating condition.

Then, in Step 4, monitor and record the axial force sensor output of the axial force sensor 66 while the spindle 2 is in an operating condition, and simultaneously monitor and record the data of the spindle 2 and the mechanical equipment equipped with the spindle 2 (not shown), the data includes at least the processing conditions of the temperature, rotational speed and cutting force of the spindle 2, and may also include, but not limited to, the processing efficiency of the mechanical equipment, the processing accuracy and the test results, etc.

Finally, in Step S5, integrate the data established and accumulated by Steps S1 to S4 and store the data in a database (not shown) so that the user can analyze the data of the database to obtain the best spindle preload amount when the user needs to design or adjust the spindle preload amount, wherein the user can analyze the data of the database through the technology of the Internet of Things and artificial intelligence.

As can be seen from the above-described preferred embodiment, the present invention allows the user to quickly and immediately know the spindle preload amount through the technical features of the aforesaid steps. The method of the present invention is applicable regardless of whether the spindle 2 is in the operating condition or the cold condition. Furthermore, the spindle preload amount obtained by the present invention can be clearly quantified compared to the conventional natural frequency method or the torque method, so that the user can more accurately adjust the size of the spindle preload amount for finding the spindle preload amount that is most suitable for its processing state. In addition, through the database established by the invention, the machinery factory can adjust the spindle preload amount according to different customer needs. For example, the demand for A customer is to operate at a high speed and a high temperature, and the demand for B customer is to operate at a low speed and a low temperature, at this point, the machinery factory can quickly determine the best spindle preload amount corresponding to the customer's machine through the data of the database, without having to wait until the client station fails and then to go back for adjustment. It is obvious that the present invention does have the efficacy that is not expected by the prior art.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for obtaining a spindle preload amount of a bearing of a spindle in an operating condition, comprising the steps of:
   obtaining a plurality of spindle preload amounts of said spindle in a cold condition through a PPC (Push-Pull-Curve) Preload Analyzer;
   synchronously obtaining a plurality of axial force sensor outputs of said bearing of said spindle in the cold condition corresponding to said plurality of spindle preload amounts through an axial force sensor to establish a relationship between said plurality of spindle preload amounts and said plurality of axial force sensor outputs; and
   measuring an axial force sensor output in said operating condition through said axial force sensor and obtaining a corresponding one of said spindle preload amounts of said bearing of said spindle in said operating condition through said relationship between said plurality of spindle preload amounts and said plurality of axial force sensor outputs.

2. The method of claim 1, wherein said axial force sensor is installed on said spindle.

3. The method of claim 1, wherein said spindle comprises a bearing spacer; said axial force sensor is installed on said bearing spacer.

4. A method for obtaining an optimal spindle preload amount of a bearing of a spindle in an operating condition through a database, comprising the steps of:
   obtaining a plurality of spindle preload amounts of said bearing of said spindle in a cold condition through a PPC (Push-Pull-Curve) Preload Analyzer;
   synchronously obtaining a plurality of axial force sensor outputs of said bearing of said spindle in the cold condition corresponding to said plurality of spindle preload amounts through an axial force sensor to establish a relationship between said plurality of spindle preload amounts and said plurality of axial force sensor outputs; and
establishing said database having said plurality of spindle preload amounts and said plurality of axial force sensor outputs, and then obtaining said optimal spindle preload amount according to machining state of said spindle in the operating condition through said database.

\* \* \* \* \*